United States Patent Office 2,854,425
Patented Sept. 30, 1958

2,854,425

COMPOSITION AND ARTICLE COMPOSED OF A POLYMER OF ETHYLENE AND A CHLOROSULFONATED POLYMER OF ETHYLENE AND THE METHOD OF PRODUCING THEM

Vernon G. Boger and Alexander G. Thomas, Akron, Ohio, assignors to The B. F. Goodrich Company, New York, N. Y., a corporation of New York No Drawing. Application May 13, 1955
Serial No. 508,316

20 Claims. (Cl. 260—33.6)

The present invention relates to adherent, smooth, tough and non-blocking films, protective coatings and the like comprising a chlorosulfonated polymer of ethylene. More specifically, this invention relates to a novel composition of matter comprising chlorosulfonated polyethylene, to a novel method of making said composition, to a novel method of utilizing said composition to form rapidly non-blocking, adherent, smooth and tough films and to a novel article of manufacture containing such films or coatings.

Chlorosulfonated polyethylenes are elastomers and have many desirable properties making them useful in a number of applications. For example they are relatively hard, have good tear strength and high abrasion resistance, exhibit excellent flex life, are resistant to deterioration by heat and show exceptionally good weathering when tested outdoors and especially when formulated with materials that act as screens to ultra-violet light. In particular, such elastomers are very useful in protecting rubbery materials from deterioration due to ozone. These elastomers, thus, find wide application in a variety of articles such as belting, weather stripping, hose, floor tile, cable covering, coated fabrics, laminated articles, etc.

In preparing coatings or films from compositions, paints, etc. comprising chlorosulfonated polyethylene, air or room temperature curing agents, pigments, solvent, etc., it is necessary to dry the material for extended periods of time at room temperature to eliminate the solvent. It is not desirable usually to heat the film in order to avoid rapid volatilization of the solvent and the formation of blisters, pin holes and the like. Moreover, the use of heat increases the danger of fire. Thus, the prior art processes are uneconomical and undesirable. Furthermore, even after removal of solvent, articles coated with such compositions cannot be stacked nor folded so that the chlorosulfonated coatings or layers touch each other because blocking or damage to the surface coatings will occur by failing to completely separate or by adhesion of one coating to another causing separation of the coating from the underlying stratum if attempts are made to separate the coatings due to the adhesion which occurs between them. Dusting of dried and partially cured chlorosulfonated polyethylene coatings with talc and the like will not entirely eliminate blocking and also results in an unsightly surface and undesired condition for subsequent handling. It is only after a considerable period of time, usually after air or room temperature curing for several weeks so that the polymer is essentially cured, that such surfaces can safely be brought into contact with each other. Accordingly, prior processes have suffered from the disadvantage of requiring long periods of time to effect drying and curing of the chlorosulfonated polyethylene coatings and have required much equipment in order to handle the same. This problem is particularly serious where large objects or objects having a large surface area such as tents, tarpaulins and similar structures are involved since it is impractical to build ovens or other devices to dry and cure such coated articles. Since they necessarily must occupy considerable space during air curing, the number of units produced is reduced and production costs are increased.

It, therefore, is a primary object of the present invention to provide a method of producing tough and durable coatings, films and the like of a composition comprising chlorosulfonated polyethylene in which the coatings can be dried in a relatively short period of time and which are non-blocking.

It is another object of this invention to provide an economical method for producing in a relatively short period of time an adherent, smooth, tough and non-blocking coating of a composition comprising chlorosulfonated polyethylene on a base material.

Still another object of this invention is to provide a method for producing a chlorosulfonated polyethylene containing composition characterized by forming non-blocking, adherent and tough coatings.

A further object is to provide a composition of matter comprising chlorosulfonated polyethylene and characterized by forming dry, non-blocking, adherent and tough coatings and films in a relatively short period of time.

A still further object is to provide an article of manufacture containing a coating, layer or the like of a non-blocking, adherent and tough composition comprising chlorosulfonated polyethylene.

These and other objects and advantages of the present invention will become more apparent to those skilled in the art from the following detailed description and examples.

It now has been found according to the present invention that compositions comprising a curable chlorosulfonated polymer of ethylene can readily be dried to form non-blocking, adherent and tough coatings, films, layers and the like by thoroughly blending by hot mixing or fluxing a polymer of ethylene with the composition containing the curable chlorosulfonated polymer of ethylene. These new compositions can be dissolved in solvents at room temperature and then used to coat a base material. Such coatings air-dry at room temperature in a relatively short period of time to produce non-blocking layers which can be folded together or pressed against each other and then separated without any damage to the coatings as compared to a composition without polyethylene which requires a long period to dry and must be fully cured to prevent blocking.

Chlorosulfonated polymers of ethylene are rubber-like tacky materials of low strength in the uncured state but are curable in air at room temperature (about 25° C.) over long periods of time to form relatively strong non-tacky rubbers, although they can be cured at elevated temperatures say at 265–275° F. for from 30 to 60 minutes depending on the thickness of the sample, in the presence of a curing agent. In general, they contain from about 18 to 50% chlorine and from about 0.5 to 4% of sulfur. Most of the chlorine is believed to be substituted along the hydrocarbon chain while the sulfur is believed to be combined with the chlorine and attached to the chain as sulfonyl chloride groups and the substitution is believed to be random. The carbon atoms of the polymer can be of any number although usually they are well in excess of 20 and the molecular weights of the compounds are generally above 1,000. Mixtures of chlorosulfonated polymers can also be used. Various methods are available for making chlorosulfonated polyethylenes. An example of one method for making a chlorosulfonated polyethylene compound is shown in U. S. Patent 2,405,971.

Polyethylene is a well-known polymer formed by the polymerization of ethylene at 335–390° F. and at pressures of 15,000–30,000 p. s. i. Polymers of varying molecular weight can be obtained by applying certain controls to the process. Still other processes are known for producing polyethylene. The molecular weight of the polyethylene used should be at least about 6,000 to provide tough, durable coatings. Polyethylene polymers having molecular weights below 6,000 are too soft and waxy at room temperature to provide tough, durable and abrasion resistant coatings. In the practice of the present invention, the polyethylene can be employed in very minor amounts and the resulting composition will exhibit improved drying rates and freedom from blocking as compared to a composition without polyethylene. Large amounts can also be employed without detracting appreciably from the adhesion of the coating to a base material and from the smoothness and toughness of the coating or the other desirable properties afforded by the chlorosulfonated polyethylene. Very large amounts of polyethylene are to be avoided since the resulting films are grainy and weak. However, for best results as to drying rates, non-blocking properties, adhesion, smoothness and toughness, it is preferred to employ polyethylene in the relative proportions of from about 5 to 120 parts by weight of polyethylene to about 100 parts by weight of chlorosulfonated polyethylene.

Curing agents are desired for the chlorosulfonated polyethylene of the composition in order to improve strength and durability and to eliminate tack and can be any of the well-known curing agents for a polymer of this type such as magnesium oxide, litharge, dibasic lead phosphite, monohydrous tribasic lead sulfate, coprecipitated lead ortho-silicate and silica gel, tribasic lead maleate, etc. Of the various curing agents known, it is preferred to employ tribasic lead maleate since vulcanizates containing the same do not readily discolor in sunlight nor readily adsorb moisture. The amount of curing agent may vary widely depending on the type of cure desired although usually from about 20 to 60 parts by weight of curing agent per 100 parts by weight of the chlorosulfonated polyethylene will be satisfactory. Moreover, the curing agents are desirably finely-divided in order to improve blending of the components of the composition and to reduce the amount of curing agent required with obtainment of optimum physical properties.

Organic curing agents can also be used in the composition of the present invention to cure the chlorosulfonated polyethylene. Examples of suitable organic curing agents are aromatic and aliphatic diamines, amides, carbamates, cyanates, guanidines, isocyanates, oximes, nitroso compounds, substituted thiazoles, thioamides, thiocarbamates and thioureas. 2-mercaptoimidazoline and dipentamethylene thiuram tetrasulfide may also be used.

Other compounding ingredients are also desirably added to the composition to improve processing, ultimate properties, physical appearance and the like and include accelerators, organic acids, fillers, color pigments, fungicides, fire resistant materials and stabilizers. Antioxidants and plasticizers can be added although they are not generally necessary nor desirable. Examples of some of the materials useful as compounding ingredients are dipentamethylene thiuram tetrasulfide, 2-mercaptoimidazoline, both of which are also curing agents, diphenyl guanidine, di-o-tolylguanidine salt of dicatecholborate, benzothiazyl disulfide, 2-mercaptobenzothiazole, hydrogenated rosin, wood rosin, carbon black, calcium carbonate, clay, barytes, blanc fixe, cellulose floc, wood flour, silica gel, precipitated calcium silicate, arc silica, "Monox" or silicon monoxide, adipic acid, butyl alcohol, antimony trioxide, titanium dioxide, mica, polyesters, smoked natural rubber containing sulfur, light "Circo" oil, boiled linseed oil, polymerized trimethyl dihydroquinoline, yellow iron oxide, red iron oxide, "Heliozone" wax, Benzidine Yellow, Parazolone Orange, Red Barium Lithol Toner, Yellow Lead Chromate, etc. Light "Circo" oil is a light processing oil or softener made by the Sun Oil Company and has substantially the following properties: light yellow to amber-colored, sp. gr. at 60° F. of 0.907–0.925, Saybolt U. V. at 100° F. of 150–165 sec., A. S. T. M. Neutralization No. of 0.10 max., flash point of 325° F. min., fire point of 370° F. min., aniline point of 150–175° F., and heating loss of 1% max. "Heliozone" wax is a sun-resistant wax made by E. I. du Pont de Nemours & Co., Inc., and has substantially the following properties: greenish yellow to yellow-colored, sp. gr. of 0.92, heating loss of 0.20% max., ash of 0.10% max., insoluble in gasoline at 120° F.–0.20% max., and melting point, scum, of 140–164° F. The benzidine yellows are typically couplings made using the tetra azo compounds of benzidine derivatives and acetocetanilide or its derivatives. The pyrazoline oranges are azo compounds having the pyrazoline ring structure. Red barium lithol toner is an example of a metal salt of an acid azo dye, for example, $HO(C_{10}H_6)NN(C_{10}H_6)SO_3Ba(OH)$. These pigment colors are well known and made by various concerns. These compounding ingredients are employed in the amounts necessary for processing and to obtain the desired properties in the final coating. However, with respect to fillers per se it is desired in order to obtain the best durability to use not more than about 50%, and preferably not more than about 35%, of fillers by volume based on the total volume of the chlorosulfonated polyethylene and the polyethylene.

While various organic solvents and mixtures thereof can be used, it is preferable to employe volatile chlorinated hydrocarbons and aromatic hydrocarbons to insure that all of the chlorosulfonated polyethylene and polyethylene will dissolve or go into solution and not gel, merely disperse nor necessitate elevated temperatures for solution and in order to obtain a homogenous, satisfactory coating on evaporation of the solvent. Furthermore, it is best to use the aromatic hydrocarbons such as benzene, toluene, xylene, and mixtures thereof, etc., rather than the chlorinated hydrocarbons such as carbon tetrachloride, chloroform and the like for reasons of economy and health. It is a feature of the present invention and could in nowise have been expected that the composition of chlorosulfonated polyethylene and polyethylene will dissolve in aromatic hydrocarbons at room temperature whereas polyethylene requires at least a temperature of 60° C. before it alone will go into solution in such solvents. This discovery is an important aid in processing since it avoids the necessity of careful heating of the composition during mixing and vapor control equipment and reduces the danger of explosions and fires, although heat can be employed if desired to speed solution. The amount of solvent required will vary according to the total amount of polymers present and to the viscosity desired for the resulting mixture. Generally, it is only necessary to use the amount required to dissolve the polymers and to disperse the other ingredients uniformly in the mixture to obtain a readily flowable or spreadable mixture which on evaporation of the solvent will form an adherent, homogenous, smooth, and tough film. However, the amount of solvent can be varied widely to provide stiff trowelable pastes to easily brushed or sprayed liquids, lacquers, paints, etc.

In preparing the composition of the present invention the chlorosulfonated polyethylene and the polyethylene are thoroughly mixed by hot blending or fluxing on a mill, in a Banbury and the like, the curing agent and other compounding ingredients added and the resulting stock placed in a churn with the required amount of solvent and stirred to cause solution of the polymers and other solubles and dispersion of the insoluble materials such as the metal oxide pigments. However, to obtain the best compositions and blending of the polymers it is preferred to work the chlorosulfonated polyethylene on a cold rubber mill with some of the compounding ingredients and then to blend this material in small proportions with previously plasticized or softened polyethylene on a hot mill at a batch temperature of about 200–230° F. The remaining compounding ingredients including the curing or vulcanizing agent are next added to the blend of the polymers after they have been cooled to a batch temperature of about 150–180° F. on a cold mill. After mixing, the stock is desirably cooled before being added to the solvent in a churn and stirred at room temperature. It, of course, is apparent that the times of mixing will depend on batch and mill sizes, the types and amounts of accelerators, curing agents, pigments, etc. and the relative amounts of polymers employed.

The composition disclosed herein can easily be applied to base materials by brushing, dipping, roller coating, spreading or using a doctor blade, spraying and the like. The base materials employed can be natural rubber, GR–S rubber (67–75 parts by weight of butadiene-1,3, balance essentially styrene copolymers), rubbery copolymers of butadiene-1,3 and acrylonitrile, chlorosulfonated polyethylene, neoprene (chlorobutadiene-1,3 containing polymers or copolymers), mixtures of rubbers, nylon (long-chain linear superpolyamides), polyvinyl chloride-type resins, cotton, rayon, "Orlon," a synthetic polymer comprising acrylonitrile having the formula

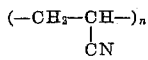

and made by E. I. du Pont de Nemours and Co., Inc., etc. The base materials, also can be porous, rough or smooth and can be in the form of film, fibers, matted fibers, fabric, weftless fabric, and knitted goods, laminates and the like. It is not necessary to specially prepare the base materials to receive the composition of the present invention other than to clean them. In some cases use of a detergent or a solvent to tackify their surfaces will be desirable. In other cases an adhesive may prove useful. It, of course, is apparent that the composition of the present invention can be used as an adhesive to bind two surfaces such as neoprene and nylon to each other or can be used to obtain a self-supporting film by depositing the composition on a stainless steel belt or other surface, drying and stripping it from the belt. These cast films can be used as protective wrappings per se, or before or after complete curing, they can be adhered to a base material by means of adhesives, or if uncured, by sometimes merely calendering the film onto the base material. While liquid coating compositions are preferred for ease in handling and for producing thin adherent films, it is apparent that the hot milled blended mixture of polymers can also be sheeted out and/or calendered onto a suitable support or onto a substrate or other base material and permitted to cure or be cured to form useful wrapping materials, etc.

After applying the coating composition of the present invention, the coated base material is dried in air at room temperature. It is unnecessary to heat the coating and often undesirable as blisters may form unless the coating(s) are carefully applied and heated. Depending on the number of coats or the thickness of the coating applied, the time of air drying or for evaporation of the solvent, at room temperature may vary from several minutes to several hours. On the other hand, compositions without polyethylene will require considerably longer periods of time to dry until a non-blocking film is obtained, usually from 5 to 10 times as long or longer. Some curing of the chlorosulfonated polyethylene apparently also occurs during the drying process, although since the composition is not heated but air cured, curing probably continues for some time after the surface of the coating is dry, non-tacky and non-blocking. A feature of the use of the coating composition of the present invention is that it can be applied to a fabric base, air dried in a relatively short time to form a tough and non-tacky film and then the coated surfaces can be pressed together and released after a period of time without any separation of the coating showing that the coating is non-blocking. This result is of particular utility in forming large fabric articles such as tents because as soon as the coating is dry and probably long before the chlorosulfonated polyethylene component of the composition is cured, the tents can be folded and packed without any danger that, when the tent is unpacked and unfolded for use, there will be blocking of the coating.

The coatings of the compositions of the present invention are tough, durable, homogenous appearing and adherent to the underlying base. Smooth, glossy coatings can be obtained depending on the method of application. They exhibit the same good weatherability, good crack resistance when flexed at temperatures as low as −20° F., good fire, heat, light, mildew and water resistance and a high resistance to ozone under accelerated tests as do straight chlorosulfonated polyethylene coatings but are superior as to drying rate and non-blocking properties. When compounded with materials to prevent color change due to ultra-violet light, the coatings are also as good as those exhibited by chlorosulfonated-polyethylene alone. The compositions also have high shelf-life.

It is not precisely understood how polyethylene functions with the chlorosulfonated polyethylene to produce fast drying, non-blocking films. Polyethylene is relatively inert and difficult to blend with other polymers or to cast from solvents as a homogenous film. In fact, it is only soluble in aromatic hydrocarbons such as benzene, toluene and xylene after heating to a temperature of at least 60° C. Even so, when the resulting solution is cooled, the polyethylene tends to flocculate from the solvent and continuous films cannot be cast at room temperature. On the other hand, when it is hot milled with chlorosulfonated polyethylene, the resulting composition will dissolve in aromatic hydrocarbons at room temperature to form what is believed to be a true solution which can readily be deposited on base materials to form non-blocking, adherent, tough and homogenous appearing coatings on air drying but before complete curing. Merely dissolving the polymers together in solvent with the other compounding ingredients and casting the solution to form a film on evaporation of the solvent results in a granular, weak, agglomerated coating which is unsuitable. Moreover, it is not clear why the polyethylene serves to increase the drying rate of the composition in view of its relative inertness and incompatibility with many materials. Since the film is believed to be continuous and not porous the polyethylene is not believed to be forming pores or points for the evaporation of solvent nor does it seem to plasticize the chlorosulfonated polyethylene. Whatever may be the true explanation of the phenomenon, it has been found that polyethylene can readily be hot blended or milled with chlorosulfonated polyethylene to afford a composition which will readily dissolve in aromatic solvents at room temperature to form a solution which can be deposited on a base material to provide fast air drying, non-blocking coatings even before the chlorosulfonated polyethylene component of the composition has fully cured.

The following examples will serve to illustrate the invention with more particularity to those skilled in the art:

EXAMPLE I

A composition of chlorosulfonated polyethylene and polyethylene was prepared using the following components in the amounts indicated:

*Stock composition*

| Components: | Parts by weight |
|---|---|
| Chlorosulfonated polyethylene [1] | 100.0 |
| Polyethylene, powdered [2] | 50.0 |
| Adipic acid | 2.0 |
| Staybelite resin (hydrogenated rosin) | 5.0 |
| Titanox RA–50 (Rutile $TiO_2$) | 60.0 |
| Titanox A–MO (Anatase $TiO_2$) | 25.0 |
| Antimony trioxide | 10.0 |
| Heliozone wax | 3.0 |
| Mica | 15.0 |
| Tribasic lead maleate | 40.0 |
| Diphenyl guanidine | 1.0 |
| Mercapto benzothiazyl disulfide | 2.0 |

[1] Du Pont "Hypalon" having about 27.5% chlorine and 1.5% sulfur. Most of the chlorine is believed to be substituted along the hydrocarbon chain while the sulfur is believed to be combined with chlorine and attached to the chain as sulfonyl chloride ($SO_2Cl$). Approximately one chlorine atom is present for every 6 to 7 carbon atoms and one sulfonyl chloride group is present for every 100 carbon atoms and the substitution is believed to be random.
[2] Du Pont "Alathon G."

The chlorosulfonated polyethylene was added to a cold 12 inch rubber mill equipped with a cold water line and kept cold by means of cold water running through the mill and worked for about three minutes. In the meantime the polyethylene was softened on a second mill, equipped for steam and heated to 200° F., until it changed from a white powder to a semi-transparent sheet. Adipic acid and Staybelite resin were then thoroughly dispersed into the milled chlorosulfonated polyethylene on the cold mill. The mixture was removed from the cold mill and added piece by piece to the polyethylene on the hot mill and the two polymers were then mixed for about 8 minutes or until thoroughly blended. Periodical temperature readings of the batch were taken by means of a pyrometer to see that the temperature of the blend was maintained between 200 and 220° F. After thorough blending of the polymers, the batch was stripped from the hot mill and allowed to cool for about 10 minutes and then placed on the cold mill with cold water running through the mill and antimony trioxide, Titanox A–MO and Titanox RA–50 in the order named were mixed with the polymers. Tribasic lead maleate, diphenyl guanidine and mercapto benzothiazyl disulfide are added last and mixed for about 4 minutes or until the yellow color of the tribasic lead maleate had disappeared, indicating that the latter materials had thoroughly dispersed into the mixture of polymers. The resulting composition was then stripped from the mill, sheeted to a thickness of about ⅛ inch and allowed to cool. Part of the above material was then placed in cans with solvents and, at room temperature (about 25° C.), agitated on mechanical rollers for sixteen hours and finally stirred with a small high-speed propeller-type mixer for one hour. At the end of this period the stock was properly dispersed to result in a smooth paint. The amount of stock and solvents used are as follows:

| Components: | Parts |
|---|---|
| Above stock composition grams | 100 |
| Toluene ml | 150 |
| Xylene ml | 150 |
| Butyl alcohol ml | 50 |

A portion of the above paint was sprayed onto the surface of a neoprene coated nylon fabric and permitted to air dry at room temperature (about 25° C.). At the end of three hours the paint coating was dry and portions of the coated fabric were folded and pressed by hand together so that the painted surfaces contacted each other. On attempting to separate them, it was observed that the painted coatings separated easily without any tendency to stick and without damaging or marring their surfaces to show they were non-blocking. The paints were adherent to the base material, durable, tough and smooth. When a similar composition was prepared except that it did not contain polyethylene and was used to paint a neoprene coated nylon fabric, it required about 18 hours to dry and when the dried painted surfaces were pressed together and attempts made to separate them, they could not be separated without damaging and marring their surfaces, by one paint layer adhering to the other and pulling partly or entirely away from the base layer.

The above compositions comprising chlorosulfonated polyethylene with and without polyethylene were also given a severe blocking test as follows:

A testing jig was made consisting of two 3" x 4" metal plates bolted together with a 100 lb. spring brazed on the inner surface of one plate. Three coats of each paint were then applied to a neoprene-coated nylon panel and allowed to dry in air for 24 hours. The coating was about 1.5 to 3.0 mils thick. Two test specimens of the paint to be tested were then cut out of each panel with a circular die 2" in diameter and placed, painted surfaces against each other, on the lower plate centered opposite the 100 lb. spring. A soft rubber disc and a steel plate were placed between the specimens and the spring for more even distribution of pressure. The apparatus was bolted lightly together and compressed in a small compression testing machine to get 20 p. s. i. pressure. The jig was locked at this pressure by tightening the bolts and placed in an oven at 120° F. for 5 days. Other tests were run at 160° F. At the end of this period, the specimens were removed and visually-inspected and the results obtained are shown below where the degree of blocking is expressed as percent separation of the two adjacent coatings:

| Paint | Percent Separation | |
|---|---|---|
| | 120° F. | 160° F. |
| (A) Chlorosulfonated polyethylene and polyethylene composition | 100 | 95 |
| (B) Chlorosulfonated polyethylene composition | 10 | 5 |

These results show that after test at 120° F. the painted surfaces of the composition of the present invention will completely separate while the painted surfaces of a chlorosulfonated polyethylene composition alone will only separate 10% or 90% of the surface will not separate or will be damaged and marred. At 160° F., the present paint composition shows that only 5% of its surfaces will stick while the straight chlorosulfonated polyethylene shows that 95% of its surfaces will stick. It, thus, is clear that the composition of the present invention is from about 10 to 20 times better than a straight chlorosulfonated polyethylene composition as to its non-blocking properties.

EXAMPLE II

The method of this example was the same as Example I, above, except that a larger mill having cold water and steam connections and larger batches of the polymers were used. The chlorosulfonated polyethylene was first milled cold followed by the addition of adipic acid and Staybelite resin and then the mill was heated and the polyethylene was slowly added, the temperature of the batch not being above 230° F. After the two polymers had been blended, the stock and mill were cooled and the remaining ingredients were added, except the curing agent and accelerators, and the temperature of the batch during this step did not exceed about 180° F. The batch was cooled again, to about 150° F. and the curing agent and accelerators added and milling continued being sure that the batch temperature did not exceed 180° F. After mixing, the blend was cooled and added to solvents in drums which were rolled for 24—48 hours and stirred for 8 hours. The resulting paint was thereupon tested and exhibited results similar to those shown in Example I, above.

EXAMPLE III

This example was similar to Example I, above, except that the ratios of the chlorosulfonated polyethylene to polyethylene in the compositions prepared were varied as follows:

| Polymers | Ratio of Polymers to Each Other by Weight in Compositions | | |
|---|---|---|---|
| | A | B | C |
| Chlorosulfonated Polyethylene | 80 | 57 | 50 |
| Polyethylene | 20 | 43 | 50 |

Paints prepared from the above compositions also exhibited fast drying rates and non-blocking coatings when dry. The coatings or paints were also adherent, durable and tough to neoprene coated nylon base materials.

In summary, the present invention teaches that rapid drying non-blocking films, layers, etc. of chlorosulfonated polyethylene base compositions alone or as coatings on various base materials can be obtained by throughly blending by hot mixing polyethylene with the chlorosulfonated polyethylene, dissolving the blend in a solvent for the same at room temperature and permitting the solution to air dry at room temperature. The composition permits the obtainment of non-blocking, adherent, homogenous appearing and tough coatings in a relatively short period of time. Fabrics and other base materials can be folded as soon as dry without fear of damage to the dried coating or delamination of the same. The composition, thus, reduces the time required to obtain satisfactory coatings, reduces the hazards attendant when elevated temperatures are employed to volatilize the solvent, and enables the economical and ready production of coated objects of large size even before the coatings are completely cured.

What is claimed is:

1. A composition of matter comprising a polymer of ethylene and a chlorosulfonated polymer of ethylene in the ratio of from about 5:100 to 120:100 parts by weight, said polymers having been blended together by mixing at a temperature of from about 200 to 230° F. and characterized by forming non-blocking, durable, and tough films on air drying from aromatic hydrocarbon solvents.

2. A composition of matter comprising from about 5 to 120 parts by weight of a polymer of ethylene, 100 parts by weight of a chlorosulfonated polymer of ethylene and a minor amount of a curing agent sufficient at least to partially cure said chlorosulfonated polymer of ethylene, said polymers having been blended together by mixing at a temperature of from about 200 to 230° F.

3. A composition of matter comprising from about 5 to 120 parts by weight of a polymer of ethylene, 100 parts by weight of a chlorosulfonated polymer of ethylene and a volatile organic solvent in an amount at least sufficient to dissolve said polymers and to provide a coating composition, said polymers having been blended together by mixing at a temperature of from about 200 to 230° F.

4. A composition of matter according to claim 3 in which said solvent is a volatile aromatic hydrocarbon containing solvent and containing additionally a finely-divided curing agent in an amount of from about 20 to 60 parts by weight per 100 parts by weight of said chlorosulfonated polymer of ethylene.

5. A composition of matter comprising from 50 to 20 parts by weight of polyethylene to from 50 to 80 parts by weight of chlorosulfonated polyethylene blended together by mixing together at a temperature of from about 200 to 230° F., from about 20 to 60 parts by weight per 100 parts by weight of said chlorosulfonated polyethylene of a finely-divided curing agent for said chlorosulfonated polyethylene and a volatile aromatic hydrocarbon containing solvent in an amount at least sufficient to dissolve said polymers and to form a coating composition.

6. An article of manufacture comprising a tough, durable and non-blocking film of a composition comprising from about 5 to 120 parts by weight of a polymer of ethylene to 100 parts by weight of a chlorosulfonated polymer of ethylene blended by mixing together at a temperature of from about 200 to 230° F.

7. An article of manufacture comprising a base material and secured thereto an adherent, tough, durable and non-blocking layer comprising from about 5 to 120 parts by weight of an ethylene polymer to 100 parts by weight of a chlorosulfonated ethylene polymer blended together by mixing together at a temperature of from about 200 to 230° F.

8. An article of manufacture according to claim 7 wherein said chlorosulfonated ethylene polymer has been at least partially cured with a minor amount by weight of a curing agent for said chlorosulfonated ethylene polymer.

9. An article of manufacture according to claim 8 wherein said curing agent is finely-divided and is employed in an amount of from about 20 to 60 parts by weight per 100 parts by weight of said chlorosulfonated ethylene polymer.

10. An article of manufacture according to claim 9 in which said base material comprises a long chain synthetic polymeric amide having recurring amide groups as an integral part of the main polymer chain and capable of being formed into a filament in which the structural elements are oriented in the direction of the axis and wherein said polymeric amide contains a coating of a composition comprising a polymer of chlorobutadiene-1,3 disposed in adhering relationship between said polymeric amide and said non-blocking layer.

11. An article of manufacture comprising a fabric of a long chain synthetic polymeric amide having recurring amide groups as an integral part of the main polymer chain and capable of being formed into a filament in which the structural elements are oriented in the direction of the axis, an adherent coating on said fabric of a composition comprising a polymer of chlorobutadiene-1, 3, and an adherent, tough, durable and non-blocking layer on said coating comprising from 50 to 20 parts by weight of polyethylene to from 50 to 80 parts by weight of chlorosulfonated polyethylene thoroughly blended together by mixing together at a temperature of from about 200 to 230° F. and cured with from about 20 to 60 parts by weight per 100 parts by weight of said chlorosulfonated polyethylene of a finely-divided curing agent for said chlorosulfonated polyethylene.

12. The method which comprises mixing together at a temperature of from about 200 to 230° F. a polymer of ethylene and a chlorosulfonated polymer of ethylene in the ratio of from about 5:100 to 120:100 parts by weight, said composition being characterized by forming non-blocking, durable and tough coatings on air drying from aromatic solvents.

13. The method of making a composition characterized by providing adherent, tough, durable and non-blocking coatings which comprises mixing together at a temperature of from about 200 to 230° F. a polymer of ethylene and a chlorosulfonated polymer of ethylene in the ratio of from about 5:100 to 120:100 parts by weight, cooling the resulting composition and mixing therewith a minor amount of a curing agent for the chlorosulfonated polymer of ethylene sufficient at least partially to cure the chlorosulfonated polymer of ethylene.

14. The method of making a composition capable of forming an adherent, tough, durable and non-blocking coating on evaporation of solvent from the coating which comprises blending together at a temperature of from about 200 to 230° F. a polymer of ethylene and a chlorosulfonated polymer of ethylene in the ratio of from about 5:100 to 120:100 parts by weight and then mixing said blend with a volatile organic solvent in an amount at least sufficient to dissolve said polymers and to form a coating composition.

15. The method of making a coating composition capable of forming an adherent, tough, durable and non-blocking coating on evaporation of solvent from the coating which comprises thoroughly blending together at a temperature of from about 200 to 230° F. a polymer of ethylene and a chlorosulfonated polymer of ethylene in the ratio of from about 5:100 to 120:100 parts by weight, cooling the resulting blend, mixing with said cooled blend a finely-divided curing agent for said chlorosulfonated polymer of ethylene in an amount of from about 20 to 60 parts by weight per 100 parts by weight of said chlorosulfonated polymer of ethylene and mixing at room temperature the resulting composition with a volatile aromatic hydrocarbon containing solvent in an amount at least sufficient to dissolve said polymers and to form a coating composition.

16. The method of making a coating composition capable of forming an adherent, tough, durable and non-blocking coating on evaporation of solvent from the coating which comprises thoroughly mixing together at a temperature of from about 200 to 230° F. from 50 to 20 parts by weight of polyethylene and from 50 to 80 parts by weight of chlorosulfonated polyethylene, cooling the composition formed, mixing with the cooled composition from about 20 to 60 parts by weight per 100 parts by weight of the chlorosulfonated polyethylene of a finely-divided curing agent for the chlorosulfonated polyethylene and mixing the resulting composition at room temperature with a volatile aromatic hydrocarbon containing solvent in an amount at least sufficient to dissolve said polymers and to form a coating composition.

17. The method which comprises applying a liquid composition as a layer on a support and evaporating the solvent therefrom, said composition comprising a polymer of ethylene and a chlorosulfonated polymer of ethylene in the ratio of from about 5:100 to 120:100 parts by weight and a volatile organic solvent in an amount at least sufficient to dissolve said polymers, said polymers having been blended together at a temperature of from about 200 to 230° F. prior to incorporation into said solvent.

18. The method which comprises applying a liquid composition as a layer on a support and evaporating the solvent therefrom, said composition comprising a polymer of ethylene and a chlorosulfonated polymer of ethylene in the ratio of from about 5:100 to 120:100 parts by weight, a minor amount of a curing agent for the chlorosulfonated polymer of ethylene sufficient to at least partially cure the same and a volatile organic solvent in an amount at least sufficient to dissolve said polymers and to form a coating composition, said polymers having been blended together at a temperature of from about 200 to 230° F. prior to incorporation into said solvent.

19. The method which comprises applying a layer of a liquid composition to a base material and air drying said layer at room temperature to form an adherent, tough, durable and non-blocking layer, said composition comprising a polymer of ethylene and a chlorosulfonated polymer of ethylene in the ratio of from about 5:100 to 120:100 parts by weight, from 20 to 60 parts by weight of a finely-divided curing agent per 100 parts by weight of the chlorosulfonated polymer of ethylene and a volatile aromatic hydrocarbon containing solvent in an amount at least sufficient to dissolve said polymers and to form a coating composition, said polymers having been thoroughly blended together at a temperature of from about 200 to 230° F. prior to incorporation into said solvent, and said base material comprising a long chain synthetic polymeric amide having recurring amide groups as an integral part of the main polymer chain and capable of being formed into a filament in which the structural elements are oriented in the direction of the axis and wherein said polymeric amide contains a coating of a composition comprising a polymer of chlorobutadiene-1,3 disposed in adhering relationship between said polymeric amide and said non-blocking layer.

20. The method which comprises applying a layer of a liquid composition to a base material and air drying said layer at room temperature to form an adherent, tough, durable and non-blocking layer, said composition comprising from 50 to 20 parts by weight of polyethylene to from 50 to 80 parts by weight of chlorosulfonated polyethylene, from 20 to 60 parts by weight per 100 parts by weight of the chlorosulfonated polyethylene of a finely-divided curing agent for said chlorosulfonated polyethylene and a volatile aromatic hydrocarbon containing solvent in an amount at least sufficient to dissolve said polymers and to form a coating composition, said polymers having been thoroughly blended by mixing together at a temperature of from about 200 to 230° F. prior to incorporation into said solvent, and said base material comprising a long chain synthetic polymeric amide having recurring amide groups as an integral part of the main polymer chain and capable of being formed into filaments in which the structural elements are oriented in the direction of the axis and wherein said polymeric amide contains a coating of a composition comprising a polymer of chlorobutadiene-1,3 disposed in adhering relationship between said polymeric amide and said non-blocking layer.

References Cited in the file of this patent

UNITED STATES PATENTS

| 2,416,060 | McAlevy et al. | Feb. 18, 1947 |
| 2,618,574 | Pavlic | Nov. 18, 1952 |
| 2,630,398 | Brooks et al. | Mar. 3, 1953 |

OTHER REFERENCES

Wakeman: Chemistry of Commercial Plastics (1944), page 257.